United States Patent
Schoneborn et al.

(10) Patent No.: US 10,279,337 B2
(45) Date of Patent: May 7, 2019

(54) NOX TRAP CATALYST SUPPORT MATERIAL WITH IMPROVED STABILITY AGAINST BAAL2O4 FORMATION

(71) Applicant: Sasol Germany GmbH, Hamburg (DE)

(72) Inventors: Marcos Schoneborn, Hamburg (DE); Thomas Harmening, Munster (DE); Dirk Niemeyer, Brunsbuttel (DE); Sonke Rolfs, Itzehoe (DE); Johanna Fabian, Brunsbuttel (DE)

(73) Assignee: Sasol Germany GmbH, Hamburg (DE)

(*) Notice: Subject to any disclaimer, the term of this patent is extended or adjusted under 35 U.S.C. 154(b) by 0 days.

(21) Appl. No.: 15/552,474

(22) PCT Filed: Mar. 8, 2016

(86) PCT No.: PCT/EP2016/000413
§ 371 (c)(1),
(2) Date: Aug. 21, 2017

(87) PCT Pub. No.: WO2016/142058
PCT Pub. Date: Sep. 15, 2016

(65) Prior Publication Data
US 2018/0065112 A1    Mar. 8, 2018

(30) Foreign Application Priority Data
Mar. 9, 2015    (EP) .................... 15158315

(51) Int. Cl.
*B01J 23/00*    (2006.01)
*B01J 23/34*    (2006.01)
(Continued)

(52) U.S. Cl.
CPC .......... *B01J 23/34* (2013.01); *B01D 53/9422* (2013.01); *B01J 23/002* (2013.01);
(Continued)

(58) Field of Classification Search
CPC ...... B01J 23/002; B01J 23/34; B01J 37/0045; B01J 37/0205; B01J 37/04; B01J 37/08; B01J 37/086
See application file for complete search history.

(56) References Cited

U.S. PATENT DOCUMENTS 5,728,365 A * 3/1998 Martin ................. C01G 39/006
423/306
5,730,951 A * 3/1998 Martin .................. B01J 23/007
252/518.1
(Continued)

FOREIGN PATENT DOCUMENTS

CN    101785996    7/2010
DE    19503522    8/1996
(Continued)

OTHER PUBLICATIONS

Jouini, et al., "Growth and Characterization of Mn2+ activated magnesium aluminate spinel single crystals" J Crystal Growth, vol. 293, No. 2, 2006, p. 517-521.
(Continued)

*Primary Examiner* — Cam N. Nguyen
(74) *Attorney, Agent, or Firm* — Bushman Werner, P.C.

(57) ABSTRACT

The present invention relates to a method for the production of a support material for a nitrogen oxide storage component that is applicable in catalysts for treating exhaust gases from lean-burn engines and a support material made according to said process that is stable against the reaction with a Barium compound to form $BaAl_2O_4$.

20 Claims, 3 Drawing Sheets

(51) Int. Cl.

| | |
|---|---|
| *B01J 37/00* | (2006.01) |
| *B01J 37/02* | (2006.01) |
| *B01J 37/04* | (2006.01) |
| *B01J 37/08* | (2006.01) |
| *B01D 53/94* | (2006.01) |
| *C01F 7/16* | (2006.01) |
| *C01G 45/12* | (2006.01) |
| *F01N 3/08* | (2006.01) |
| *F01N 3/10* | (2006.01) |
| *B01J 37/03* | (2006.01) |
| *B01J 35/00* | (2006.01) |

(52) U.S. Cl.
CPC ....... *B01J 37/0045* (2013.01); *B01J 37/0205* (2013.01); *B01J 37/04* (2013.01); *B01J 37/08* (2013.01); *B01J 37/086* (2013.01); *C01F 7/162* (2013.01); *C01G 45/12* (2013.01); *F01N 3/0814* (2013.01); *F01N 3/0842* (2013.01); *F01N 3/101* (2013.01); *B01D 2255/2042* (2013.01); *B01D 2255/2047* (2013.01); *B01D 2255/2073* (2013.01); *B01D 2255/2092* (2013.01); *B01D 2255/91* (2013.01); *B01D 2258/012* (2013.01); *B01J 23/007* (2013.01); *B01J 35/002* (2013.01); *B01J 37/033* (2013.01); *B01J 2523/00* (2013.01); *C01P 2002/54* (2013.01); *C01P 2002/72* (2013.01)

(56) References Cited

U.S. PATENT DOCUMENTS

| | | | | |
|---|---|---|---|---|
| 5,776,424 A | * | 7/1998 | Martin | B01J 23/007 423/306 |
| 5,830,822 A | * | 11/1998 | Euzen | B01J 23/002 502/355 |
| 6,440,888 B1 | * | 8/2002 | Stamires | B01J 20/06 106/632 |
| 6,504,061 B1 | | 1/2003 | Okamoto | |
| 7,022,304 B2 | * | 4/2006 | Stamires | B01J 21/16 423/594.16 |
| 7,025,873 B2 | * | 4/2006 | O'Connor | B01J 21/16 208/118 |
| 7,033,487 B2 | * | 4/2006 | O'Connor | B01J 21/16 208/113 |
| 7,351,382 B2 | * | 4/2008 | Pfeifer | B01D 53/944 422/177 |
| 7,473,663 B2 | * | 1/2009 | Jones | B01J 20/06 502/400 |
| 7,576,024 B2 | * | 8/2009 | Jones | B01J 21/16 502/68 |
| 8,454,917 B2 | * | 6/2013 | Hoyer | B01D 53/9422 423/213.2 |
| 2005/0207956 A1 | | 9/2005 | Vierheilig | |
| 2012/0240554 A1 | | 9/2012 | Qi et al. | |

FOREIGN PATENT DOCUMENTS

| | | |
|---|---|---|
| DE | 102009010711 | 9/2010 |
| EP | 1317953 | 6/2003 |
| JP | 2002302544 | 10/2002 |
| WO | WO 2005/092481 | 10/2005 |

OTHER PUBLICATIONS

Jang, et al. "Deterioration Mode of Barium-Containing NOx Storage Catalyst" Catalysis Letters, vol. 77 (2001) p. 21-22.

Lephuc, et al. "NOx Removal Efficiency and Ammonia Selectivity during the NOx Storage Reduction Process . . . " Applied Catalysis B, vol. 101 (2011) p. 362-371.

* cited by examiner

NOX TRAP CATALYST SUPPORT MATERIAL WITH IMPROVED STABILITY AGAINST BAAL2O4 FORMATION

This application is a national phase application of PCT/EP2016/000413, filed Mar. 8, 2016, which claims priority to EP 15158315.0, filed Mar. 9, 2015, the disclosures of which are incorporated herein by reference for all purposes.

The present invention relates to a method for the production of a support material for a nitrogen oxide storage component that is applicable in catalysts for treating exhaust gases from lean-burn engines and a support material obtainable according to said process that is stable against the reaction with a Barium compound to form $BaAl_2O_4$.

BACKGROUND OF THE INVENTION

To abate the NOx content in the exhaust gas of lean-burn gasoline engines and in particular diesel engines, designated NOx after-treatment systems are required. In three-way catalysis the reduction of NOx to $N_2$ is possible under nearly stochiometric conditions. Under the oxidizing conditions of a lean-burn engine this reduction is not possible. Therefore, a special exhaust gas after-treatment catalyst has been developed containing a material that is able to store NOx, e.g. as a nitrate under lean conditions. By applying short stoichiometric or rich operation conditions the stored NOx can then be converted to nitrogen and the storage material regenerated. This catalyst is commonly called a (lean) NOx-trap catalyst and is described for example in EP 1317953 A1.

As stated in EP 1317953 A1 a NOx-trap catalyst contains a nitrogen oxides storage material consisting of storage components, deposited on suitable support materials in a highly dispersed manner in order to create a large area of interaction with the exhaust gas. Materials that are able to store nitrogen oxides in the form of nitrates are for example the oxides, carbonates or hydroxides of alkaline earth metals, particularly of Barium.

A suitable support material has to provide a high specific surface area and a high thermal stability to ensure long-term durability of the final catalyst. Furthermore, the chemical composition and properties of the support material influences the nitrogen oxide conversion efficiency and the temperature operation window of the NOx-trap catalyst.

A beneficial material regarding the before mentioned properties that is well described in the art for use as a support material is a homogenous Mg/Al mixed oxide, with a magnesium oxide concentration of 1 to 40 wt. % based on the total weight of the oxide.

The term Mg/Al mixed oxide describes a mixture of the two oxides on an atomic scale and therefore excludes a physical mixture of the two individual oxides as well as materials prepared by impregnation of aluminium oxide with a magnesium oxide precursor solution. This type of Mg/Al mixed oxide is preferably obtained by calcination of a Mg/Al mixed oxide precursor that is obtained via hydrolysis of a mixture of the alkoxides that is for example described in detail in DE 19503522 A1 (=U.S. Pat. No. 6,517,795).

Further improvements of the activity and durability of a NOx-trap catalyst were achieved by using the homogenous Mg/Al mixed oxide support materials that further have been doped with a cerium based oxide, for example by coating the Mg/Al mixed oxide with cerium oxide and/or praseodymium oxide. WO 2005/092481 A1 claims the observed benefits in the catalyst performance to be closely associated with the doping of the Mg/Al mixed oxide with cerium oxide when compared to a physical mixture of Mg/Al mixed oxide with cerium oxide.

However, it turned out that when a cerium oxide doped homogenous Mg/Al mixed oxide used as a state-of-the-art support material is combined with a suitable barium compound as nitrogen oxide storage component, a thermal aging treatment (at 850° C. for 4 h) leads to the formation of $BaAl_2O_4$. It is well known (e.g. Jang et. al, *Catalysis Letters* 77 (2001) 21) that the formation of $BaAl_2O_4$ by reaction of the storage component with parts of the support material leads to deterioration of the NOx trap efficiency of the storage material because this compound has no ability to store nitrogen oxides in the form of nitrates. Therefore, in order to further enhance the thermal durability of NOx trap catalysts there is a need for support materials having an improved stability against the formation of inactive $BaAl_2O_4$.

Materials comprising manganese oxide and/or a mixture of cerium and manganese oxide for use in automotive emission control catalysts are known in the art. For example US 20120240554 A1 claims the use of $MnO_x$—$CeO_2$ mixed oxide particles as oxidation catalysts to promote the conversion of NO to $NO_2$.

The use of oxides of manganese with cerium in conjunction with aluminium oxide in NOx-trap catalysts is known in the art and is taught by Le Phuc (Le Phuc, et al: "Nox Removal Efficiency and Ammonia Selectivity during the NOx storage-reduction process over Pt/BaO (Fe,Mn,Ce)$Al_2O_3$ model catalysts. Part II—Influence of Ce and Mn—Ce addition, Applied Catalysis B; Environmental 362-371). In this reference nitrate salts of Mn and Ce were simultaneously added with barium nitrate to alumina by an impregnation process. This document discloses that the addition of Mn and Ce improve storage rates and that a beneficial effect is observed when the Ce and Mn are added together. The problem of $BaAl_2O_4$ is not discussed by the prior art.

Further, as will be shown in the body of the specification, the prior art materials when undergoing a thermal aging treatment (at 850° C. for 4 h) lead to the formation of $BaAl_2O_4$, the very same problem that the present invention addresses.

The object of the present invention is therefore to provide a support material applicable in NOx trap catalysts that comprises a homogenous Mg/Al mixed oxide that is preferably doped with a cerium based oxide to offer the advantageous properties described above and additionally is stable against the reaction with the barium storage component to form $BaAl_2O_4$.

SUMMARY OF THE INVENTION

The inventors of the present application have surprisingly found a novel method of making such a support material.

According to one aspect of the invention there is provided a method of making a support material that is stable against formation of $BaAl_2O_4$ comprising the following steps:
i) providing a first suspension (optionally doped) comprising a homogenous Mg/Al mixed oxide precursor;
ii) drying of the first suspension;
iii) calcining the Mg/Al mixed oxide precursor to obtain a calcined Mg/Al mixed oxide;
iv) re-suspending the calcined Mg/Al mixed oxide to obtain a second suspension comprising the Mg/Al mixed oxide;

v) doping the re-suspended calcined Mg/Al mixed oxide with a precursor comprising a manganese oxide precursor to form a Mg/Al mixed oxide doped with at least manganese;
vi) drying the second suspension; and
vii) calcining the Mg/Al mixed oxide doped at least with manganese to form a doped Mg/Al mixed oxide.

The above method optionally comprises the further step of doping the homogenous mixed Mg/Al mixed oxide precursor with a cerium based oxide precursor in the first suspension.

DETAILED DESCRIPTION OF THE INVENTION

The cerium based oxide precursor may be added together with a precursor of an oxide of a rare earth element (a rare earth oxide precursor), other than the cerium based oxide precursor, such as lanthanum oxide, neodymium oxide, yttrium oxide, praseodymium oxide or mixtures thereof to increase the thermal stability or adjust the chemical properties of the cerium based oxide.

The Mg/Al mixed oxide precursor provided is prepared according to one embodiment by known methods in the art of the invention, i.e. by hydrolysis of a mixture of corresponding alkoxides yielding a mixture of hydrotalcite and boehmite. The amount of magnesium oxide within the (doped) homogenous Mg/Al mixed oxide is in the range of 1 to wt. 40%, preferably 10 to wt. 30%. The remainder except the doping material being $Al_2O_3$. A preferred Mg/Al mixed oxide precursor is prepared by the method described in DE 19503522 A1 (incorporated herein by reference).

As stated above, the process optionally includes doping the Mg/Al mixed oxide with a cerium based oxide. When this option is preferred, a cerium based oxide precursor is added to the first suspension of the Mg/Al mixed oxide precursor. The invention includes the option where the cerium based oxide precursor is added together with a rare earth oxide precursor.

The cerium based oxide precursor and further the rare earth oxide precursors can be independent from each other soluble salts, for example soluble salts comprising acetate and nitrate salts, or non-soluble precursors, for example those comprising hydrated oxides, hydroxides or carbonates.

After a drying and subsequent calcination step, the cerium based oxide optionally together with the rare earth oxide is finely dispersed within the homogenous Mg/Al mixed oxide that is derived by the decomposition of the Mg/Al mixed oxide precursor during the calcination step. The drying step can be any method known in the art and is preferably spray drying. The support material of the present invention includes up to wt. 50% of a cerium based oxide.

The precursor comprising a manganese oxide precursor may according to one embodiment exclusively consist of a manganese oxide precursor. In this case, the process includes the addition of between 5 to 20% wt. of a manganese oxide calculated as $MnO_2$. The precursor comprising a manganese oxide precursor may comprise a mixture of manganese oxide and cerium oxide precursors. In this case, the optionally Cerium based oxide doped homogenous Mg/Al mixed oxide is re-dispersed in water and combined with a precursor for the manganese oxide. Optionally a cerium based oxide precursor and/or a rare earth oxide precursor (other than the cerium based oxide precursor) is added, preferably simultaneously, as well as the manganese oxide precursor to the second suspension. The metal oxide precursors comprise any soluble or insoluble salts and preferably comprise the acetate salts. After drying the second suspension, preferably by spray drying, a calcination step transforms the precursors into a manganese oxide and optionally a cerium based oxide. The inventors have found that it is this sequential addition of the manganese oxide by this specific method to the mixed oxide that leads to the advantages of the invention.

When the support material of the present invention is combined with a suitable barium compound that is active as a nitrogen oxide storage component to make a nitrogen storage material, a subsequent thermal aging at a relevant temperature for the application in lean-burn exhaust systems of 850° C. for 4 h does not lead to the appearance of $BaAl_2O_4$. The absence of $BaAl_2O_4$ is characterized in that the corresponding characteristic signals in the powder X-ray diffraction pattern of the thermally aged storage material are not visible. In particular, the (020) and (112) reflections at around 40° 2Theta of the $BaAl_2O_4$ structure were utilized for the evaluation as they are not superimposed by the numerous reflections of the other phases present in the X-ray diffraction pattern.

It is shown that if the manganese oxide is added to the cerium oxide doped Mg/Al mixed oxide not by a sequential addition but by a different, conventional impregnation process or if Mn, Ce and Ba are added simultaneously as described in the prior art, the advantage of the present invention, i.e. the outstanding stability against the formation of $BaAl_2O_4$ cannot be obtained. Without intending to be bound to theory it is assumed that as a result of the process of the present invention the manganese oxide exists in the support material in a specific dispersion state that facilitates the preferred reaction of a Ba storage component to non-detrimental $BaMnO_3$. In contrast to $BaAl_2O_4$, $BaMnO_3$ is known to interact with nitrogen oxides in a positive mode resulting in a high retained NOx trap efficiency of the storage material after thermal aging.

BRIEF DESCRIPTION OF THE FIGURES

The invention will now be described with reference to the following non-limiting examples and Figures in which.

EXPERIMENTAL SECTION

Preparation of Support Materials

Example 1

Figure 1:
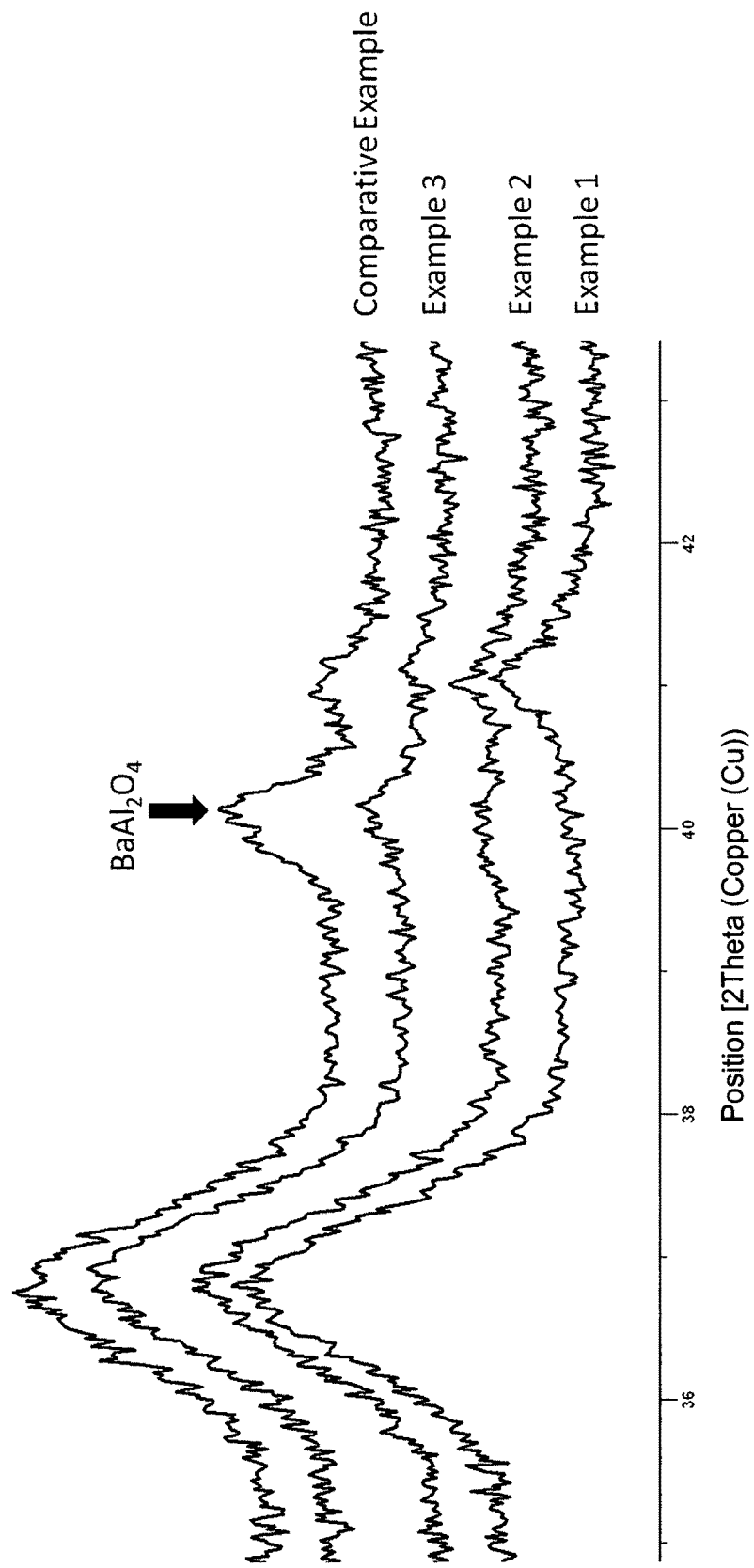
FIG. 1 represents a portion of the X-ray diffraction patterns of the materials of Examples 1 to 3 and Comparative Examples 1 and 2 after a thermal treatment at 850° C. for 4 h, showing the effect on the support stability against $BaAl_2O_4$ formation by the addition of manganese oxide to a cerium oxide doped Mg/Al mixed oxide.

An aqueous suspension of a mixed Mg/Al oxide precursor (Pural MG20, MgO content of 20 wt. %) was mixed with a cerium acetate solution. After spray drying, the resulting powder was calcined at 950° C. for 3 h to obtain the cerium oxide doped homogenous Mg/Al mixed oxide.

The powder was re-suspended in water, ball milled and mixed with a solution of manganese acetate. The mixture was spray dried and the resulting powder calcined at 550° C. for 3 h. The composition of the support material is given in Table I.

Example 2

The support material was prepared as in Example 1 but with a lower amount of manganese oxide, as shown in Table I.

Example 3

The support material was prepared as in Example 2 but with a lower amount of manganese oxide, as shown in Table I.

Comparative Example 1

The support material was prepared without the addition of manganese oxide.

An aqueous suspension of mixed Mg/Al oxide precursor (Pural MG20, MgO content of 20 wt. %) was mixed with a cerium acetate solution. After spray drying, the resulting powder was calcined at 950° C. for 3 h to obtain the cerium oxide doped homogenous Mg/Al mixed oxide.

Comparative Example 2

The support material having the same composition as in Example 1 was prepared including a different sequential addition of manganese oxide, i.e. by using a different doping process that is very well known in the art.

An aqueous suspension of mixed Mg/Al oxide precursor (Pural MG20, MgO content of 20 wt. %) was mixed with a cerium acetate solution. After spray drying, the resulting powder was calcined at 950° C. for 3 h to obtain the cerium oxide doped homogenous Mg/Al mixed oxide. Then, the powder was treated by an incipient wetness impregnation with an aqueous solution of manganese acetate, dried at 120° C. and finally calcined at 550° C. for 3 h.

To be noted is that in this comparative example the calcined Mg/Al mixed oxide is not re-suspended prior to the manganese doping step as per the present invention.

Example 4

The support material was prepared as in Example 1 but adding a mixed solution of cerium acetate and manganese acetate to the suspended cerium oxide doped homogenous Mg/Al mixed oxide. The composition of the support material is given in Table 1.

Example 5

An aqueous suspension of mixed Mg/Al oxide precursor (Pural MG20, MgO content of 20 wt. %) was mixed with a cerium and a neodymium acetate solution. After spray drying, the resulting powder was calcined at 950° C. for 3 h to obtain the cerium oxide doped homogenous Mg/Al mixed oxide. The powder was re-suspended in water, ball milled and mixed with a solution of manganese acetate. The mixture was spray dried and the resulting powder calcined at 550° C. for 3 h. The composition of the support material is given in Table I.

TABLE I

Composition of support materials

| Example | Mg/Al-oxide (wt. %) | $CeO_2$ (wt. %) | $MnO_2$ (wt. %) | |
|---|---|---|---|---|
| Example 1 | 76 | 14 | 10 | |
| Example 2 | 78 | 15 | 7 | |
| Example 3 | 80 | 15 | 5 | |
| Comp. Example 1 | 85 | 15 | 0 | |
| Comp. Example 2 | 76 | 14 | 10 | |

| | Mg/Al-oxide (wt. %) | $CeO_2$ (wt. %) | $MnO_2$ (wt. %) | $Nd_2O_3$ (wt. %) |
|---|---|---|---|---|
| Example 5 | 81 | 7.2 | 10 | 1.8 |

Testing of the Support Materials Stability Against $BaAl_2O_4$ Formation (Examples 1 to 5 and Comparative Examples 1 and 2)

The support materials obtained in Examples 1-4 and Comparative Examples 1 and 2, respectively, were suspended in water and ball milled until a d50 of 3 μm was obtained. After adding an aqueous solution of barium acetate to get a concentration of 16% of BaO, a powder was obtained by spray drying. The resulting powder was fired first at 550° C. for 3 h followed by a thermal treatment at 850° C. for 4 h. This latter treatment has been found to induce $BaAl_2O_4$ formation when state of the art materials are used as support materials for the Ba-compound. These samples were then investigated by X-ray diffraction, in particular the occurrence of the reflection of $BaAl_2O_4$ at around 40° 2theta was evaluated. Table II summarizes the results.

TABLE II

Support materials stability test
Composition storage material

| Support material used | Support material (%) | BaO (%) | $BaAl_2O_4$ formation |
|---|---|---|---|
| Example 1 | 84 | 16 | No |
| Example 2 | 84 | 16 | No |
| Example 3 | 84 | 16 | Minor |
| Comp. Example 1 | 84 | 16 | Yes |
| Comp. Example 2 | 84 | 16 | Yes |
| Example 4 | 84 | 16 | No |
| Example 5 | 85 | 15 | No |

FIG. 1 shows a portion of the X-ray diffraction patterns of Examples 1 to 3 and Comparative Example 1. It is obvious that the characteristic (020) and (112) reflections of the $BaAl_2O_4$ phase at around 40° 2theta are absent when the inventive support material of Example 1 is used. With decreasing amount of $MnO_2$ within the support material the $BaAl_2O_4$ phase can be observed in minor amounts. When a cerium oxide doped Mg/Al mixed oxide state of the art material is utilized without the addition of manganese oxide as per Comparative Example 1, a significant amount of $BaAl_2O_4$ is observed.

Comparative Example 3

The preparation process was the same as disclosed by Le Phuc. The Ce, Mn and Ba were added simultaneously to a homogenous Mg/Al mixed oxide to obtain the same composition as in Example 1.

Firstly, a Mg/Al mixed oxide precursor (Pural MG20, MgO content of 20 wt. %) was calcined at 950° C. for 3 h. The resulting Mg/Al mixed oxide was suspended at 60° C. and pH 10 in water. The nitrate salts of cerium, manganese and barium were added simultaneously under stirring while the pH was maintained by the addition of ammonia. After 30 min, the solution was evaporated at 80° C. under air and the resulting powder was dried at 120° C. The dry powder was calcined at 550° C. for 3 h followed by a thermal treatment at 850° C. for 4 h.

Comparative Example 4

The preparation process was the same as disclosed by Le Phuc. The Mn and Ba were added simultaneously to a cerium oxide doped homogenous Mg/Al mixed oxide to obtain the same composition as in Example 1.

An aqueous suspension of mixed Mg/Al oxide precursor (Pural MG20, MgO content of 20 wt. %) was mixed with a cerium acetate solution. After spray drying, the resulting powder was calcined at 950° C. for 3 h to obtain the cerium oxide doped homogenous Mg/Al mixed oxide. The resulting Mg/Al mixed oxide was suspended at 60° C. and pH 10 in water. The nitrate salts of manganese and barium were added simultaneously under stirring while the pH was maintained by the addition of ammonia. After 30 min, the solution was evaporated at 80° C. under air and the resulting powder was dried at 120° C. The dry powder was calcined at 550° C. for 3 h followed by a thermal treatment at 850° C. for 4 h.

TABLE III

| Example | Mg/Al-oxide (wt. %) | $CeO_2$ (wt. %) | $MnO_2$ (wt. %) | BaO (wt. %) | $BaAl_2O_4$ formation |
|---|---|---|---|---|---|
| Comp. Example 3 | 62 | 14 | 10 | 15 | Yes |
| Comp. Example 4 | 67 | 11 | 9 | 13 | Yes |
| Comp Example 2 | 63 | 12 | 9 | 16 | Yes |
| Example 1 | 64 | 12 | 8 | 16 | No |

Figure 2:
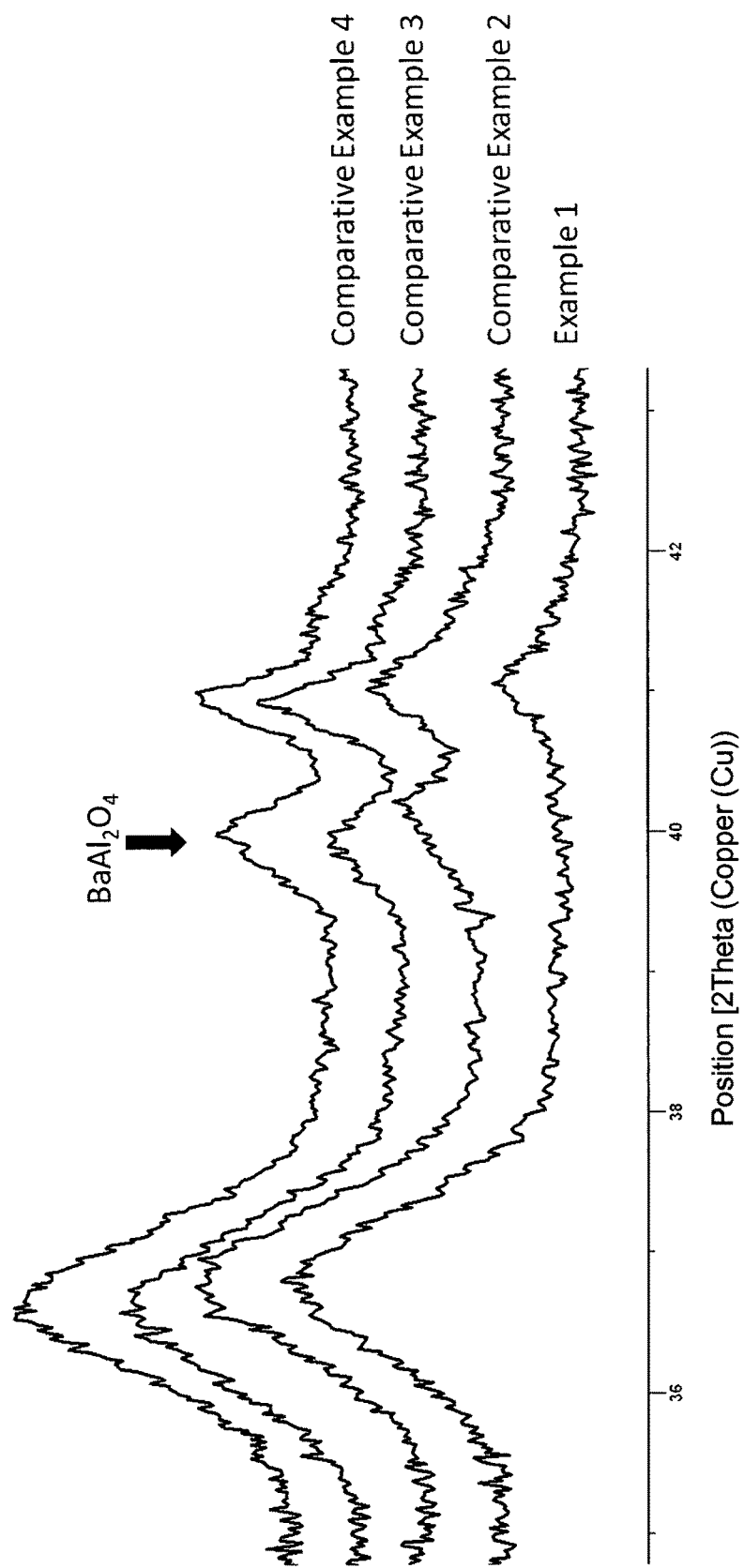
FIG. 2 represents a portion of the X-ray diffraction patterns of the materials of Examples 1 and Comparative Example 2 together with Comparative Examples 3 and 4 after a thermal treatment at 850° C. for 4 h, showing the influence of different preparation processes on the stability against $BaAl_2O_4$ formation.
Figure 3:
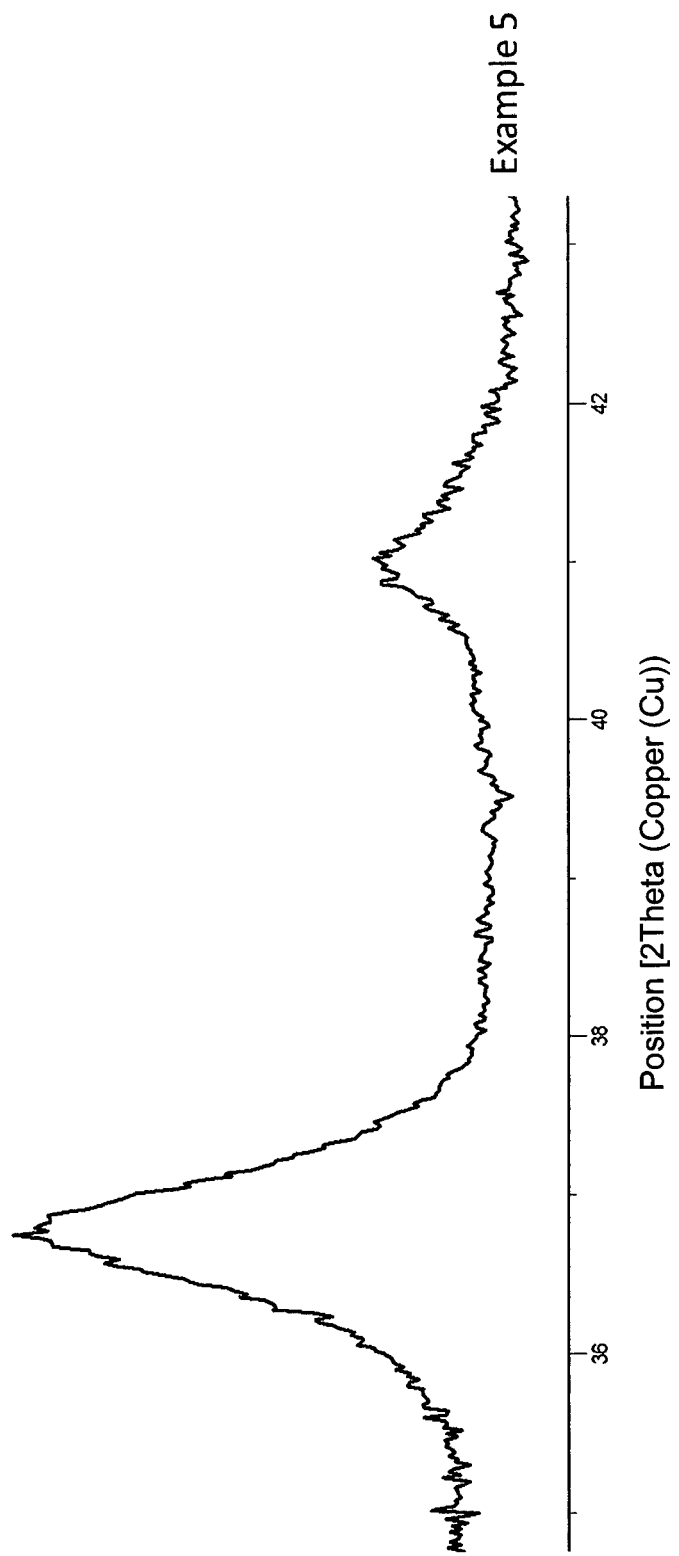
FIG. 3 represents a portion of the X-ray diffraction patterns of the material of Examples 5 after a thermal treatment at 850° C. for 4 h, showing the stability against $BaAl_2O_4$ formation by the absence of the reflection at 40° 2Theta.

FIG. 2 shows a portion of the X-ray diffraction patterns of Example 1 (novel and inventive support material) together with Comparative Example 2 and Comparative Examples 3 and 4. All materials have comparable compositions as summarized in Table III but differ in their preparation processes. Comparative Example 2 not including the re-dispersing step and Comparative Example 3 including simultaneous addition of the Ce, Mn and Ba. This demonstrates that a support material that is stable against the formation of $BaAl_2O_4$ can only be obtained by the method disclosed by the present invention, as only the material made in Example 1 to 4 is characterized by the absence of the characteristic reflections of $BaAl_2O_4$ in the X-ray diffraction pattern.

The invention claimed is:

1. A method of making a support material comprising the following steps:
   i) providing a first suspension comprising a homogeneous Mg/Al mixed oxide precursor;
   ii) drying the first suspension;
   iii) calcining the Mg/Al mixed oxide precursor to obtain a calcined Mg/Al mixed oxide;
   iv) re-suspending the calcined Mg/Al mixed oxide to obtain a second suspension comprising the Mg/Al mixed oxide;
   v) doping the re-suspended calcined Mg/Al mixed oxide with a precursor comprising a manganese oxide precursor to form a Mg/Al mixed oxide doped with at least manganese;
   vi) drying the second suspension; and
   vii) calcining the Mg/Al mixed oxide doped at least with manganese to form a doped Mg/Al mixed oxide.

2. The method of claim 1 comprising the further step of bringing together the homogeneous mixed Mg/Al mixed oxide precursor in the first suspension with a cerium based oxide precursor.

3. The method of claim 2 wherein the cerium based oxide precursor and/or the rare earth (other than cerium) oxide precursor is selected from one or more members of the group comprising acetate salts, nitrate salts, hydrated oxides, hydroxides, oxyhydrates and carbonates.

4. The method of claim 2 comprising the further step of bringing together the first suspension comprising the homogeneous mixed Mg/Al mixed oxide precursor with a cerium based oxide precursor and a rare earth (other than cerium) oxide precursor.

5. The method of claim 1 comprising the further step of bringing together the first suspension comprising the homogeneous mixed Mg/Al mixed oxide precursor with a cerium based oxide precursor and a rare earth (other than cerium) oxide precursor.

6. The method of claim 5 wherein the rare earth oxide precursor comprises lanthanum oxide, praseodymium oxide, neodymium oxide, yttrium oxide, or mixtures thereof.

7. The method of claim 6 wherein the cerium based oxide precursor and/or the rare earth (other than cerium) oxide precursor is selected from one or more members of the group comprising acetate salts, nitrate salts, hydrated oxides, hydroxides, oxyhydrates and carbonates.

8. The method of claim 5 wherein the cerium based oxide precursor and/or the rare earth (other than cerium) oxide precursor is selected from one or more members of the group comprising acetate salts, nitrate salts, hydrated oxides, hydroxides, oxyhydrates and carbonates.

9. The method of claim 1 wherein the amount of magnesium oxide, calculated as MgO, within the homogeneous Mg/Al mixed oxide precursor is in the range of 1 to 40 wt. %, relative to the doped Mg/Al mixed oxide.

10. The method of claim 1 wherein the suspension medium of the first suspension and the second suspension is water.

11. The method of claim 1 wherein the precursor comprising a manganese oxide precursor of step v) exclusively consists of a manganese oxide precursor.

12. The method of claim 11 wherein the amount of manganese oxide precursor added to the re-suspended Mg/Al mixed oxide is between 5 to 20% wt. calculated as $MnO_2$, relative to the doped Mg/Al mixed oxide.

13. The method of claim 1 wherein the amount of manganese oxide precursor added to the re-suspended Mg/Al mixed oxide is between 5 to 20% wt. calculated as $MnO_2$, relative to the doped Mg/Al mixed oxide.

14. The method of claim 1 wherein the precursor of step v) comprising a manganese oxide precursor comprises a mixture of a manganese oxide precursor and a cerium oxide precursor.

15. The method of claim 14 wherein a rare-earth (other than cerium) oxide precursor is added to the second suspension together with the manganese oxide precursor and the cerium oxide precursor.

16. The method of claim 1 wherein a rare-earth (other than cerium) oxide precursor is added to the second suspension together with the manganese oxide precursor and the cerium oxide precursor.

17. The method of claim 1 wherein in step v) a cerium based oxide precursor and/or a rare earth (other than cerium) oxide precursor are added simultaneously with the manganese oxide precursor.

18. The method of claim 1 wherein the drying of the first suspension and/or the second suspension comprises spray drying.

19. A support material produced according to a method of claim 1.

20. The support material of claim 19 comprising no $BaAl_2O_4$ after a thermal aging treatment at 850° C. for 4 h.

* * * * *